United States Patent [19]

Preiato et al.

[11] Patent Number: 5,340,295
[45] Date of Patent: Aug. 23, 1994

[54] VACUUM SIZING APPARATUS WITH CONTROLLED VACUUM

[75] Inventors: Ernest J. Preiato, Southampton, N.Y.; Marion M. Meetze; Hoopes, Mark S., both of Bay City, Mich.; Robert H. Bessemer, York, Pa.

[73] Assignee: The Conair Group, Inc., Pittsburgh, Pa.

[21] Appl. No.: 93,366

[22] Filed: Jul. 19, 1993

[51] Int. Cl.[5] .................................. B29C 35/00
[52] U.S. Cl. .................................. 425/71; 264/40.3; 264/562; 264/571; 425/149; 425/162; 425/170; 425/326.1; 425/388
[58] Field of Search .............. 264/40.3, 557, 562, 264/566, 568, 571; 425/71, 73, 86, 149, 326.1, 404, 388, 378.1, 392, 445, 162, 170, DIG. 60

[56] References Cited

U.S. PATENT DOCUMENTS

| | | | |
|---|---|---|---|
| 2,837,764 | 6/1958 | Hallam et al. | 425/71 |
| 3,539,670 | 11/1970 | Hall | 425/71 |
| 3,546,745 | 12/1970 | Ball | 425/71 |
| 4,029,452 | 6/1977 | Schippers et al. | 425/71 |
| 4,181,487 | 1/1980 | Kessler | 425/326.1 |
| 4,401,424 | 8/1983 | De Zen | 425/326.1 |
| 4,411,613 | 10/1983 | Gauchel et al. | 425/388 |
| 4,530,650 | 7/1985 | Milani | 425/71 |
| 4,575,326 | 3/1986 | French | 425/388 |
| 4,740,146 | 4/1988 | Angelbeck | 425/71 |
| 4,755,118 | 7/1988 | Ondush et al. | 425/71 |
| 5,008,051 | 4/1991 | DeCoursey et al. | 264/40.3 |

OTHER PUBLICATIONS

Two page brochure of Conair-Gatto entitled "HT Series High Technology Differential Pressure Calibrator".

*Primary Examiner*—Charles S. Bushey
*Attorney, Agent, or Firm*—Buchanan Ingersoll; George Raynovich, Jr.

[57] ABSTRACT

A vacuum sizing apparatus with a controlled vacuum is provided. The vacuum is precisely controlled by the use of a variable speed motor driven vacuum pump and a step motor controlled vent valve. An electrical circuit containing a microprocessor coordinates the speed of the motor driven vacuum pump with the position of the vent valve to give precise vacuum control within the vacuum chambers of the sizing apparatus. A closed sump tank contains water for the water system of the apparatus and is maintained at the same vacuum level as the vacuum chambers within the sizing apparatus.

20 Claims, 5 Drawing Sheets

VACUUM SIZING APPARATUS WITH CONTROLLED VACUUM

BACKGROUND OF THE INVENTION

1. Field of the Invention

This invention relates to an apparatus for cooling molten plastic extrudate as it leaves the extruder in order to hold the size and shape of the extrudate as the molten plastic cools and hardens. The vacuum sizing apparatus has a vacuum tank containing water through which the extrudate passes as it cools and hardens.

2. Description of the Prior Art

Many efforts have been made in the plastics industry to provide for the controlled cooling and accurate sizing of molten plastic extrudate after it leaves the plastic extruder. The extrudate, which is often cylindrical pipe or extruded hollow shapes can easily be deformed if excessive pressure is applied to the outer surface of the hollow shape without equalization of the pressure on the internal passages of the shape.

To overcome the deformation of plastic extrudate as a result of pressure on the external surfaces, vacuum cooling and sizing tanks have been developed that have a water bath within a vacuum chamber which prevents excessive pressure from being applied to the outer surface of the extrudate as it cools. In order for such vacuum sizing tanks to be effective, the vacuum within the tank must be precisely controlled to provide the correct external pressure on the particular extrudate being processed.

Various attempts have been made to provide a vacuum sizing apparatus with precisely controlled vacuum within the vacuum tank. A recent example of a vacuum sizing tank with electronically controlled vacuum pressure appears in U.S. Pat. No. 5,008,051. The present invention is an improvement over earlier vacuum sizing apparatus in that the present invention provides a very precisely controlled vacuum within the water bath tank.

SUMMARY OF THE INVENTION

In accordance with the present invention there is provided an apparatus for cooling and sizing a molten plastic extrudate which has a vacuum chamber containing water. An entry passage is formed in the vacuum chamber for the plastic extrudate to enter and an exit passage is formed from the vacuum chamber for the extrudate to exit the chamber. Seals are provided to seal the entry passage and the exit passage while the plastic extrudate is passing through the passages. The apparatus has a variable speed motor driven vacuum pump to reduce the atmospheric pressure within the vacuum chamber. An adjustable vent valve admits atmospheric pressure to the vacuum chamber in varying amounts depending upon the amount the vent value is opened. A pressure transducer senses the level of vacuum within the vacuum chamber and an electrical circuit controls the speed of the vacuum pump motor and the position of the adjustable vent valve to control the level of pressure within the vacuum chamber in response to signals from the pressure transducer.

Further in accordance with the present invention, there is provided a cooling and sizing apparatus that has a vacuum chamber having a main chamber, an entry sub-chamber at the inlet end of the main chamber and a water seal chamber adjacent the exit end of the vacuum chamber. A water system provides water into the vacuum chamber. The water system includes a water pump, a closed sump tank, a make-up tank to provide make-up water to the closed sump tank, water lines containing control valves to convey water from the closed sump tank to the main vacuum chamber, to the entry sub-chamber and to the water seal chamber as well as drain lines to return water to the closed sump tank and the make-up tank. There is an entry passage into the entry sub-chamber for the plastic extrudate and an exit passage from the main chamber into the water seal chamber for the plastic extrudate and seals are provided in each of these passages. An air drying chamber follows the water seal chamber in the direction of movement of the plastic extrudate whereby the plastic extrudate is subjected to drying air after leaving the water seal chamber. The apparatus has a variable speed pulse width modulated AC motor driven vacuum pump to reduce atmospheric pressure within the vacuum chamber. An adjustable vent valve having a needle valve operated by an electrical step motor admits atmospheric pressure to the vacuum chamber in varying amounts depending upon the amount that the vent valve is opened. A pressure transducer senses the level of pressure within the vacuum chamber produced by the vacuum system which includes the variable speed motor driven vacuum pump, the adjustable vent valve, and the pressure transducer. An electrical circuit is provided which includes a microprocessor responsive to signals from the pressure transducer to coordinate the speed of the vacuum pump motor and the position of the adjustable vent valve controls such that the level of pressure within the vacuum chamber is controlled.

Accordingly, a principal object of the present invention is to provide an improved vacuum sizing apparatus with controlled vacuum.

Another object of the present invention is to provide a vacuum sizing apparatus in which the vacuum is controlled by a combination of a variable speed motor driven vacuum pump and a vent valve that vents the vacuum chamber to atmosphere that are coordinated in their operations.

Another object of the present invention is to provide a vacuum control system for a vacuum sizing apparatus that has a vent valve that is always opened to atmosphere to some degree to permit constant venting of the vacuum chamber.

These and other objects of the present invention will be more completely disclosed and described in the following specification, the accompanying drawings and the appended claims.

DESCRIPTION OF THE PREFERRED EMBODIMENT

Figure 1:
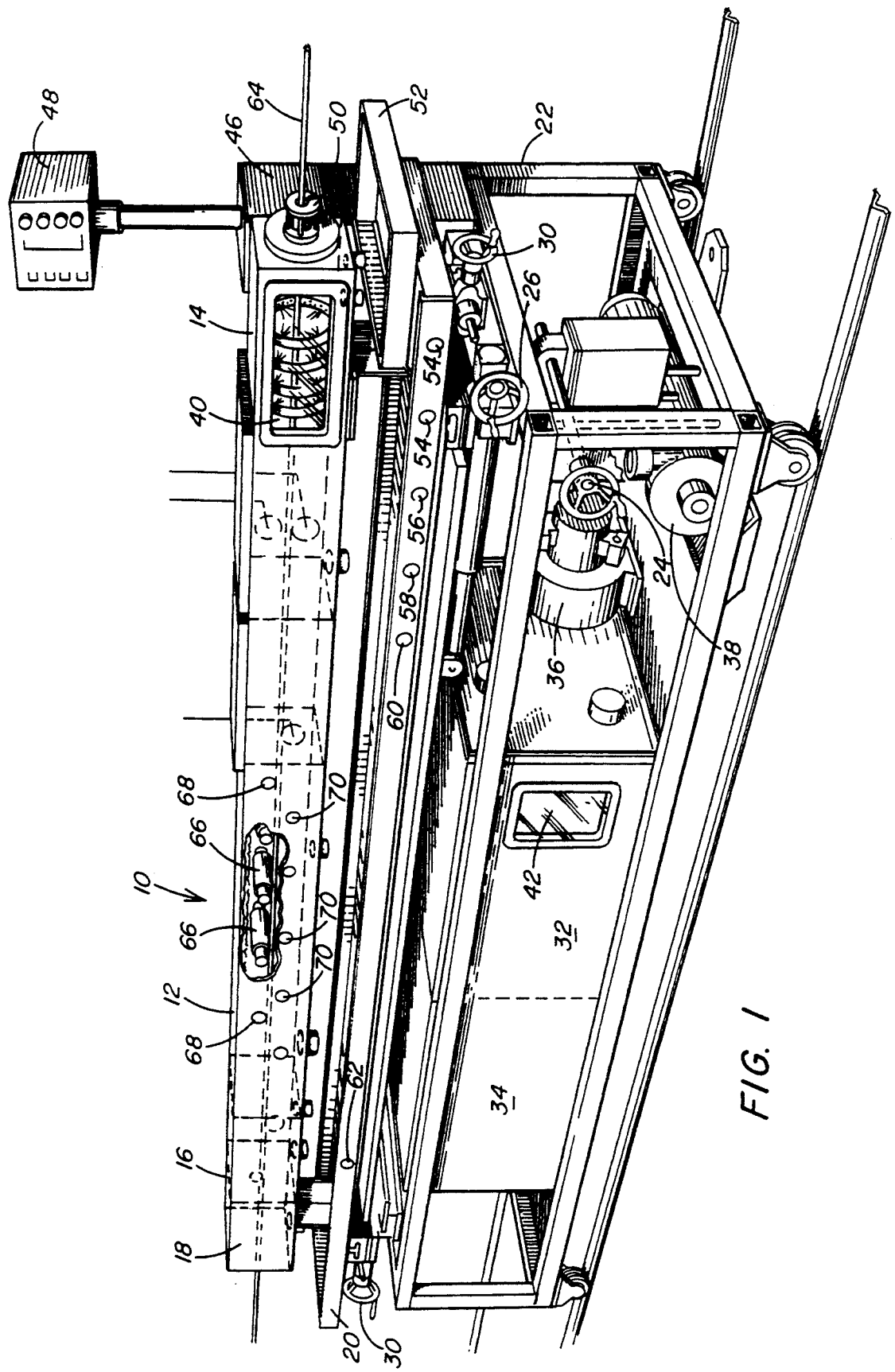
FIG. 1 is a perspective view, with portions cutaway, of the vacuum sizing apparatus of the present invention.
Figure 2:
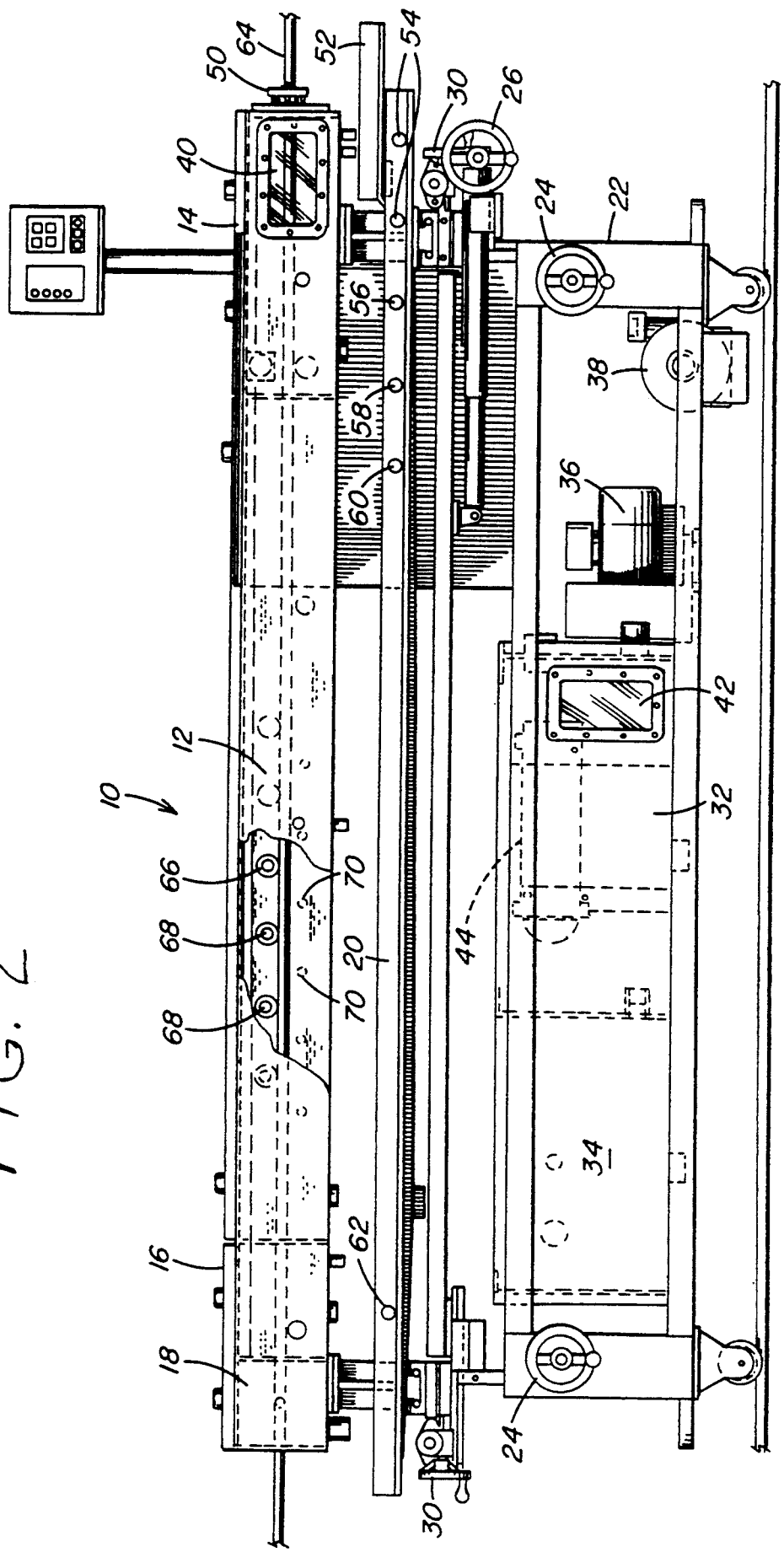
FIG. 2 is a front elevation, with portions cutaway, of the apparatus of FIG. 1.
Figure 3:
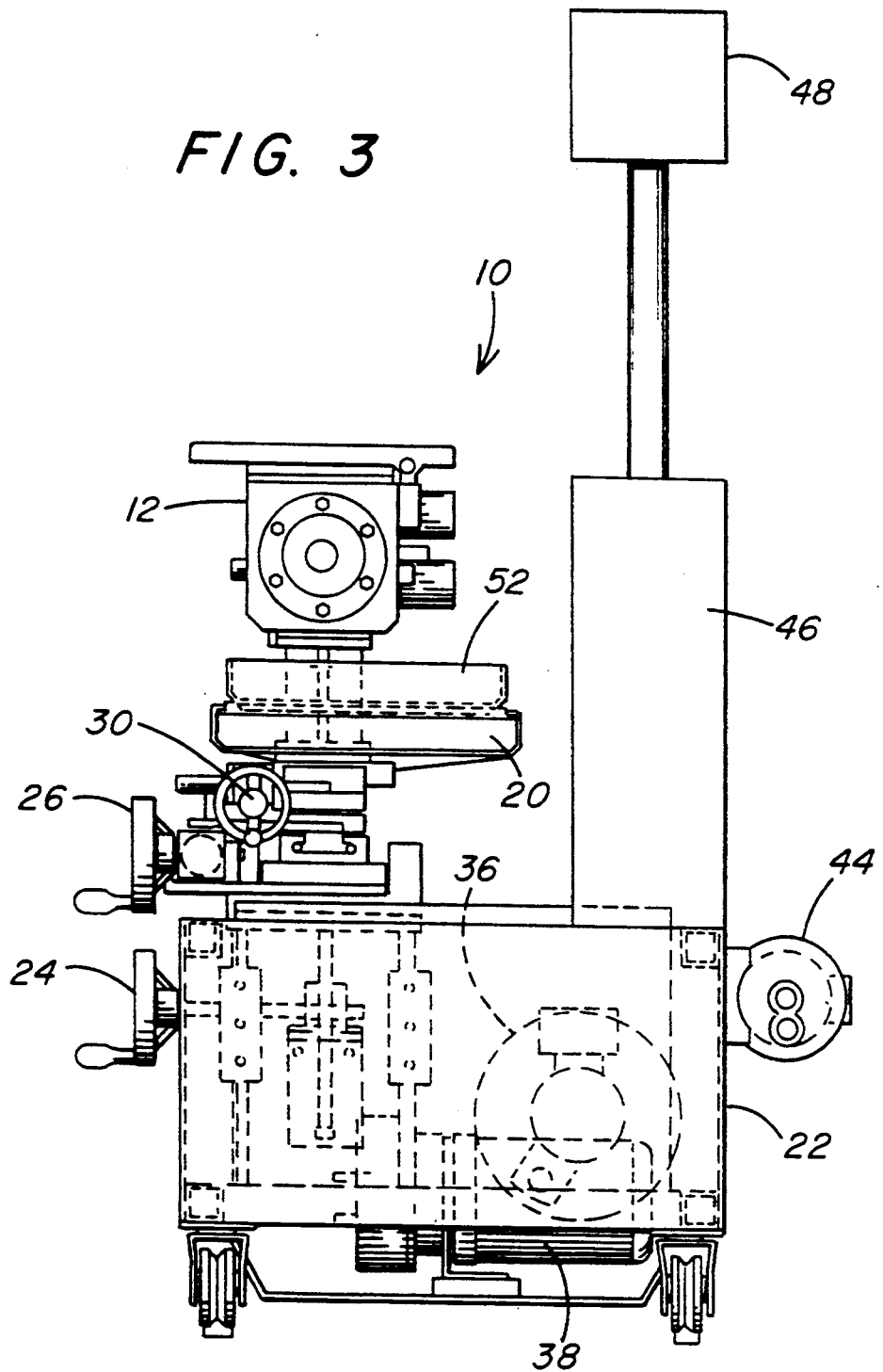
FIG. 3 is a side elevation of the apparatus of FIGS. 1 and 2.

Referring to the drawings and particularly to FIGS. 1-3, a vacuum sizing apparatus 10 has a vacuum chamber 12 with an entry sub-chamber 14. The entry sub-chamber 14 is approximately ⅓ the length of the vacuum chamber 12.

A water seal chamber 16 follows the vacuum chamber 12 in the direction of movement of extrudate through the vacuum sizing apparatus 10. An air drying chamber 18 is formed at the end of the water seal chamber 16. A drain tray 20 extends under the entire vacuum chamber 12, entry sub-chamber 14, water seal chamber 16 and air drying chamber 18 to catch any water that overflows from any of those chambers.

A base unit 22 moveably supports the vacuum chamber 12, the entry sub-chamber 14, the water seal chamber 16 and the air drying chamber 18. Vertical adjustment wheels 24 on the base unit 22 raise and lower the chambers 12, 14, 16 and 18 in a conventional fashion. A longitudinal adjustment wheel 26 permits the chambers 12, 14, 16 and 18 to be moved longitudinally to position the entry chamber 14 in proper position relative to a plastic extruder (not shown). In like fashion, lateral adjustment wheels 30 at each end of the apparatus 10 permit movement of the chambers 12, 14, 16 and 18 laterally relative to the base. The vertical adjustment wheels 24, the longitudinal adjustment wheel 26 and the lateral adjustment wheels 30 all rotate screw drives to move the upper portion of the apparatus 10 relative to the base 22.

The base unit 22 carries a closed sump water tank 32 and a make-up water tank 34. A hermetically sealed vacuum pump and variable speed motor unit 36 is secured to the base 22 and evacuates the upper portion of closed sump tank 32 in a manner to be described. The variable speed motor of the hermetically sealed unit 36 is a pulse width modulated AC motor.

A self priming water pump 38 is mounted on the lower portion of base 22 to pump water to the vacuum chamber 12, the entry sub-chamber 14 and the water seal chamber 16 as will be described. The entry sub-chamber 14 has a window 40 for viewing the extrudate as it enters the entry sub-chamber 14. The closed sump tank 32 contains a window 42 so that the water level within the tank may be viewed and so that the amount of turbulence within the tank may also be viewed. A heat exchanger 44 is mounted on the back of base 22 as best seen in FIGS. 2 and 3.

A control cabinet 46 is mounted on the base unit 22 and contains the electrical circuitry, the vent valve and the pressure transducer to be described. A control box 48 extends above the control cabinet 46 with manual controls mounted on the control box 48.

A skinning tool 50 is positioned outside the entry sub-chamber 14 to first receive extrudate before it enters the entry chamber 14. A splash tray 52 is provided under the skinning tool 50. Knobs controlling skinning tool water valve 54 are mounted on the front of the drain tray 50 to control water to the skinning tool. Knobs controlling spray pipe valve 56 as well as entry sub-chamber water valve 58 and vacuum chamber water valve 60 are also mounted on drain tray 20. A knob controlling fluid seal water valve 62 is mounted near the opposite end of drain tray 20.

As shown in FIGS. 1 and 2, the plastic extrudate 64 leaves the extruder (not shown) and enters skinning tool 50 mounted on the outer portion of entry sub-chamber 14. The skinning tool 50 has water lines (not shown) that bring water up to the skinning tool 50 to cool it as the hot molten extrudate 64 enters. The extrudate 64 then passes through the entry sub-chamber 14 and into the vacuum chamber 12. A water bath is contained within the entry sub-chamber 14 and within vacuum chamber 12. To prevent low density plastic extrudate from floating above the water bath, hold down rollers 66 shown in cut away portions of FIGS. 1 and 2 prevent the plastic extrudate 64 from floating on the surface of the water bath and hold the extrudate 64 below the surface. Because the plastic extrudate 64 can vary in size ant because the level of the water bath may also vary, two sets of bearing sockets 68 and 70 are provided for the rollers 66. The upper bearing sockets 68 are at one level while the lower bearing sockets are substantially lower. The hold down roll 66 have spring loaded axles so that they can be readily removed from sockets 68 and placed into sockets 70 or vice versa. The rolls 66 are idler rolls and are not driven.

As the extrudate passes through the vacuum chamber 12 it is cooled and hardened and the vacuum within chamber 12 is precisely maintained so that the size of the extrudate 64 is properly maintained. After passing from vacuum chamber 12, the extrudate passes into the water seal chamber 16 that permits the extrudate 64 to leave the vacuum chamber 12 without destroying the seal that maintains the vacuum within chamber 12. Upon leaving the water seal chamber 16, the extrudate 64 enters the air drying chamber 18 where an air stream removes excess water from the surface of the extrudate.

Figure 4:
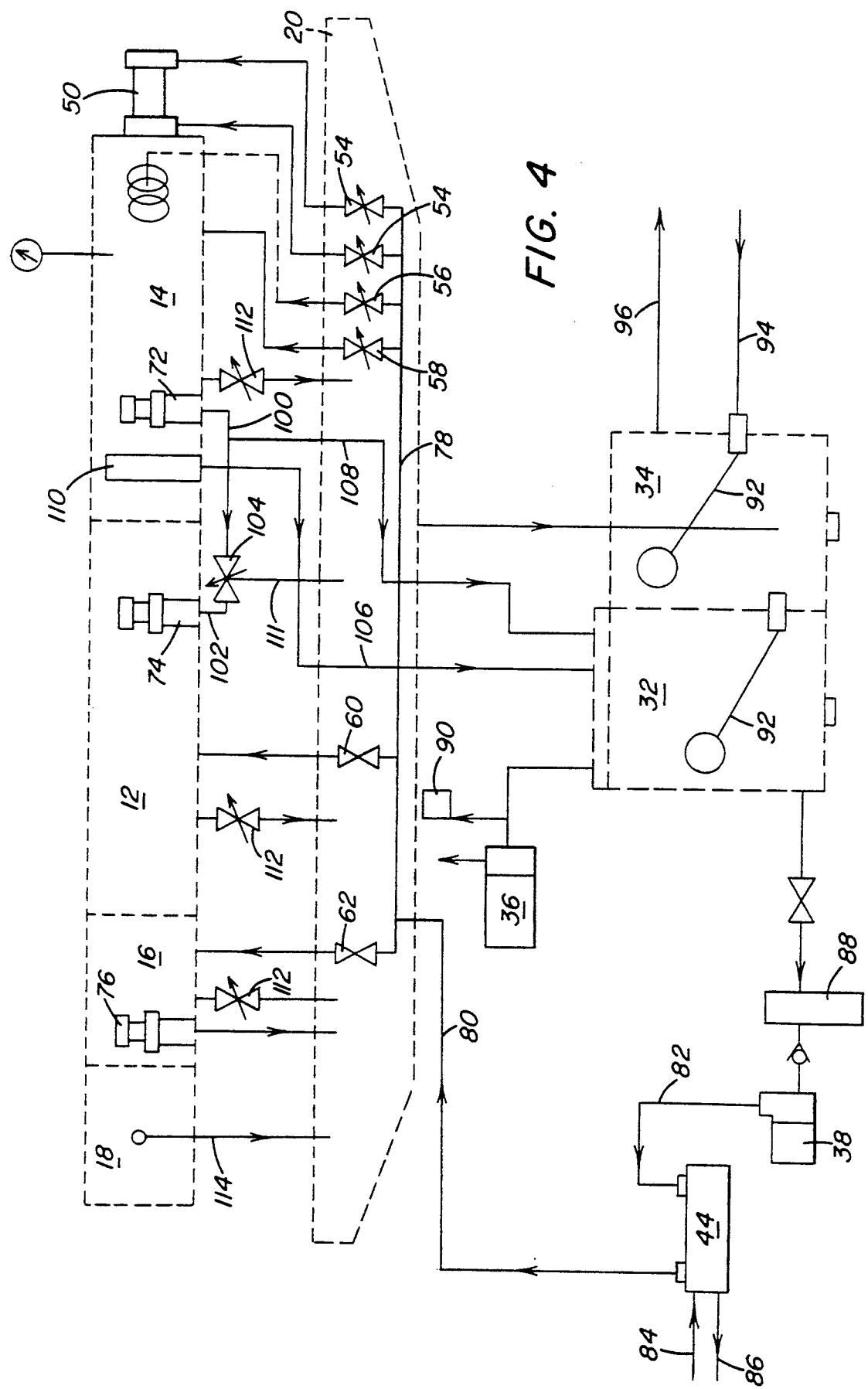
FIG. 4 is a schematic representation of the vacuum and water systems of the apparatus of FIGS. 1–3.

Referring now to FIG. 4, the entry sub-chamber 14, the vacuum chamber 12, the water seal chamber 16 and the air drying chamber 18 are shown schematically with the skinning tool 50 on the end of entry sub-chamber 14. A standpipe 72 is positioned within entry sub-chamber 14 and determines the maximum water level within entry sub-chamber 14. In like fashion, standpipe 74 in vacuum chamber 12 and standpipe 76 within water seal chamber 16 also determine the maximum water level in those chambers. A water manifold 78 feeds water through valves 54 into the skinning tool 50. Water manifold 78 also feeds water through valve 56 into an optional helical spray within entry sub-chamber 14. The manifold 78 feeds water through entry sub-chamber control valve 58 into the entry sub-chamber 14. In like manner, the manifold 78 feeds water through vacuum chamber water control valve 60 into the vacuum chamber 12 and through water seal control valve 62 into the water seal chamber 16.

A recirculation water line 80 feeds the water manifold 78 after water passes through heat exchanger 44 from a heat exchanger input line 82. In conventional fashion, the heat exchanger has a cooling water input 84 and a heat exchanger cooling water outlet 86. A filter 88 filters water before it passes through water pump 38. The water drawn into water pump 38 through filter 88 comes from a closed sump tank 32. The closed sump tank 32 contains water and is sealed to have a vacuum above the water level, which vacuum is the same vacuum as is present in the vacuum chamber 12 and entry sub-chamber 14. The hermetically sealed vacuum pump and variable speed motor unit 36 is connected by a line to the top part of closed sump tank 32. The line between sump tank 32 and the pump and motor unit 36 also leads to the vent valve 90 .

The closed sump tank 32 and the open sump tank 34 each have float valves 92 to control the water level in the respective tanks. Plant water line 94 provides make-up water to the make-up water tank 34 which is opened to the atmosphere. An overflow drain 96 bypasses the tank 34 when float valve 92 closes. The vacuum drain line 100 leads from standpipe 72 in entry sub-chamber 14 and a vacuum drain line 102 leads from standpipe 74 in vacuum chamber 12 through a three-way drain valve 104 which, under ordinary circumstances, is positioned so that vacuum drain line 100 and vacuum drain line 102 are connected with vacuum return line 108 that connects to the closed sump tank 32 above the water level. A vacuum return line 106 leads from an air pipe 110 whose opening is above the water level in entry sub-chamber 14 to the closed sump tank 32 above its water level.

It may be seen that three-way valve 104 can be positioned to connect sub-chamber 14 to vacuum chamber 12 or to vent chamber 12 to atmosphere through line 111. Valves 112 may be opened to drain the water from entry sub-chamber 14, vacuum chamber 12 and air drying chamber 18 directly into drain tray 20. The air drying chamber 18 has a constantly opened line 114 to the drain tray 20.

Figure 5:
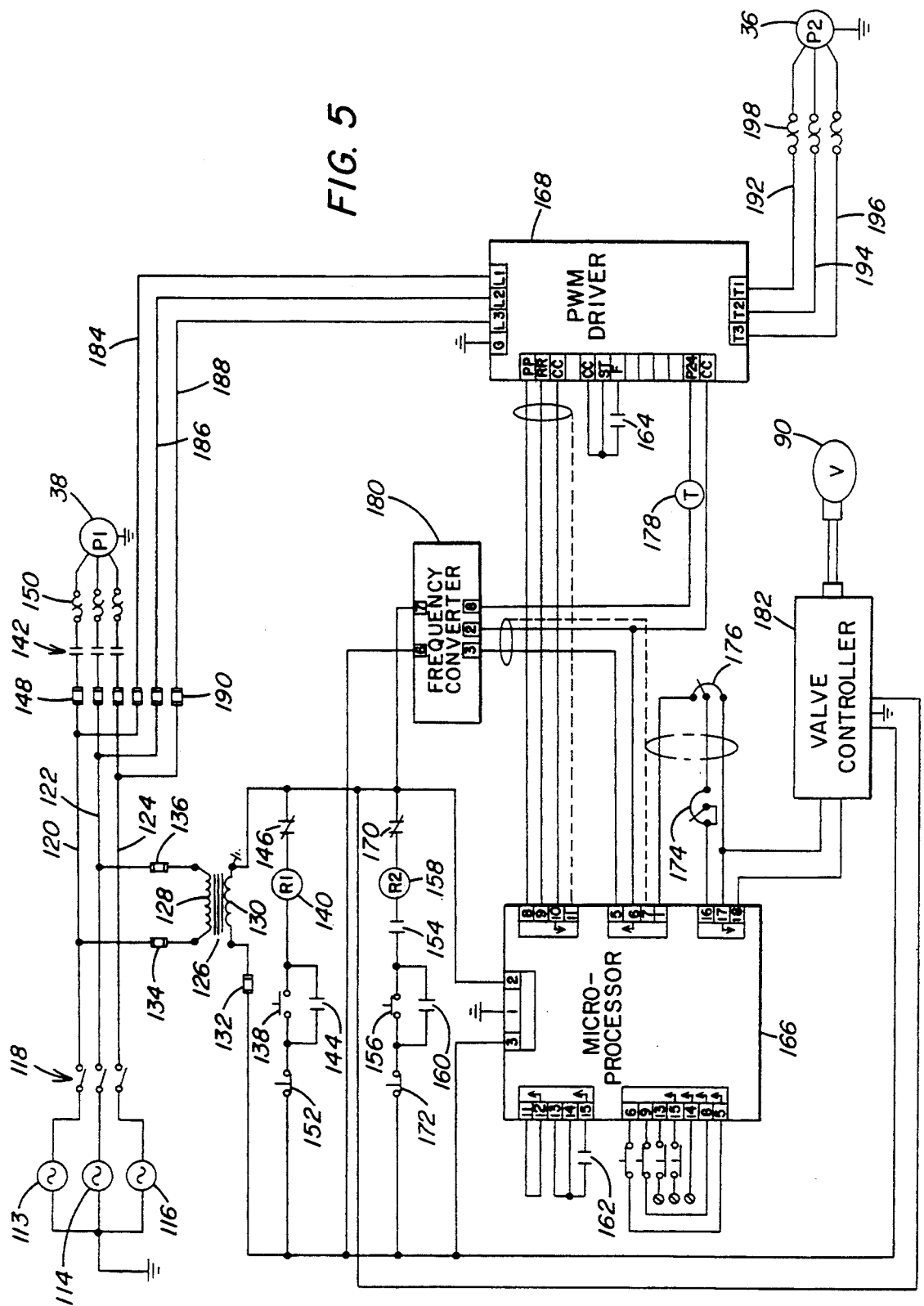
FIG. 5 is a schematic representation of electrical circuitry of the vacuum sizing apparatus of the present invention.

Referring now to FIG. 5, the electrical schematic illustrates the electrical circuitry used in the preferred embodiment of the present invention. Vacuum pump 36 and recirculating pump 38 are preferably driven by three phase AC motors as shown. Therefore, power to operate circuitry within apparatus 10 is provided by a three phase AC mains having respective phase sources 113, 114 and 116. Apparatus 10 includes a master power switch 118 to establish electrical communication between the circuitry and the AC mains. Power switch 118 includes three armatures which are connected in series with phase lines 120, 122 and 124, respectively.

The phase-to-phase voltage level here provided by the AC mains is approximately 230 VAC (at 60 cycles per second). Much of the control circuitry utilized by apparatus 10, however, is designed to be operated from a potential of 115 VAC. Transformer 126, which has primary winding 128 and secondary winding 130, provides this voltage step down. Fuses 132, 134 and 136 protect against overcurrents which may be caused, for example, by malfunctions within the circuitry or undesired voltage surges on phase lines 120, 122 and 124.

The control circuitry is provided with an interlocking scheme whereby water pump 38 must be activated before vacuum pump 36 can be started. Operation of water pump 38 is initiated by momentarily depressing switch 138 to energize coil 140 of a first relay R1. Energization of coil 140 closes three normally open contacts (collectively referenced as 142) which are respectively connected into phase lines 120, 122 and 124. Relay R1 also includes a "self sticking" contact 144 which maintains current flow through coil 140 after switch 138 is released. An overload contact 146 is also provided within relay R1 to open in the event that current passing through the overload 150 exceeds a predetermined threshold. Pump 38 is protected from overcurrents appearing in the AC mains by fuses, such as fuse 148, and overloads, such as overloads 150. Operation of pump 38 may be interrupted when desired by momentary depression of switch 152. This deenergizes coil 140, causing relay contact 144 to open.

Energization of coil 140 also closes normally open contact 154. When contact 154 is closed, it is possible to initiate operation of motor and unit pump 36. This is accomplished by momentarily depressing switch 156, which energizes coil 158 of a second relay R2. When this is done, "self-sticking" contact 160 is closed to maintain current flow through coil 158. Relay R2 also includes normally open contacts 162 and 164 which are associated with microprocessor 166 and pulse width modulated ("PWM") driver 168, respectively. The operation of microprocessor 166 and PWM driver 168, as well as other circuitry utilized to control motor and pump unit 36, will be described more fully below. A normally closed overload relay 170 deenergizes coil 158 if current flowing through overload 198 exceeds a predetermined threshold. Operation of the vacuum control circuit may be interrupted by momentarily depressing switch 172, thereby opening contact 160.

Motor and pump unit 36 is controlled along with vent valve 90 in a manner to maintain a required vacuum level within vacuum chamber 12 and entry sub-chamber 14 by a control circuit including a microprocessor 166. While other microprocessorsor discrete circuit components might be configured to achieve equivalent functions, the presently preferred embodiment of the invention utilizes an M-Trim microprocessor available from Fenner Industrial Controls, 8900 Zachary Lane North, P.O. Box 9000, Maple Grove, Minn. 55369. The pin numbers indicated therefore correspond to pin connections for this particular microprocessor model and would generally be different if another microprocessor were utilized.

Closure of the switches connected to pins 6 and 9 indicate that microprocessor 166 is in a set-up mode of operation. It will occasionally, be desirable to fine tune or otherwise change the operating parameters of microprocessor 166. After set-up, the switches connected to pins 13 and 15 are closed (thus opening the switches connected to pins 6 and 9) to place microprocessor 166 in automatic mode. Typical adjustments which may be made in the set-up mode include refinement of the settings of potentiometers 174 and 176. After the desired operating parameters have been achieved, microprocessor 166 is placed in the automatic mode.

Pressure transducer 178 measures the vacuum level within vacuum chamber 12 and entry subchamber 14 and supplies a signal representative of this pressure level to frequency converter 180. A suitable pressure transducer for this purpose is the model PX15 pressure transducer marketed by Omega Engineering Inc., 1 Omega Drive, Box 4047, Stanford, Conn. 06907 0047. This particular transducer will output a small current which increases with the level of measured vacuum.

Frequency converter 180 provides a signal of increasing frequency as the vacuum detected by transducer 178 is increased. This frequency signal is fed to microprocessor 166. In the presently preferred embodiment, frequency converter 180 may be a model CFC 10000 current-to-frequency converter which is sold by Red Lion Controls, 20 Willow Springs Circle, York, Pa. 17402.

Microprocessor 166 receives the frequency signal produced by frequency converter 180 and determines the appropriate response of motor and pump unit 36 and vent valve 90. Appropriate signals are then fed to PWM driver 168 and valve controller 182. Utilizing the above mentioned Fenner microprocessor, each of the signals output to PWM driver 168 and valve 182 will vary within a range of 0–10 VDC. Preferably, interconnections between microprocessor 166 and other components are shielded to decrease susceptibility to spurious noise and the like.

PWM driver 168 has power input lines 184, 186 and 188 which are connected to phase lines 120, 122 and 124, respectively. Serial fuses, such as fuse 190, are provided to protect PWM driver 168 and motor and pump unit 36 from excessive line currents. Power output lines 192, 194 and 196 emanate from PWM driver 168 and are connected to respective phases of motor and pump unit 36. Overloads, such as overload 198, provide additional protection against excessive currents appearing in lines 192, 194 and 196.

The operating speed of motor and pump unit 36 is dependent on the frequency of voltage appearing on lines 192, 194 and 196. Therefore, PWM driver 168 alters the frequency of the phase voltages appearing on these lines in response to the signal received from microprocessor 166. In this way, the pumping force provided by unit 36 can be effectively controlled. In the presently preferred embodiment, PWM driver 168 may be a model VFSX-2022P unit sold by Toshiba International Corporation, 13131 West Little York, Houston, Tex. 77041.

As stated above, valve controller 182 also receives an instructional signal from microprocessor 166. Based on this information, valve controller 182 instructs valve 90 to open or close by an appropriate amount. In the presently preferred embodiment, valve 90 and valve controller 182 may be a model 2PUC-M-A-2 sold by Advanced Pressure Products, University Research Park, 83 Brown Road, Ithaca, N.Y. 14850. This is a 1000 position needle valve controlled by a step motor. As the step motor rotates, the needle is selectively moved toward and away from the valve seat.

The controlled vacuum will vary from 0% to 100%. When a vacuum of 50% is desired, motor pump unit 36 is operating at 50% speed and the vent valve aperture is open approximately 60%. When a vacuum of 75% is desired, unit 36 will operate at 75% of its maximum speed and the vent valve 90 will be open 35%. Even when maximum vacuum is desired, however, valve 90 will remain open at least 10%. Additionally, when the vacuum is reduced below 50%, unit 36 is operating at greater speed. For example, at 25% of vacuum, the valve opening is set at 85%, but pump 36 is operating at a speed greater than 25% of its maximum speed. This is due to the resolution change which opens the valve as unit 36 operates. This provides an advantage by having the motor and pump unit 36 run faster and smoother than if the motor and pump unit 36 alone controlled vacuum quantity.

According to the provisions of the patent statutes, we have explained the principle, preferred construction and mode of operation of our invention and illustrated and described what we now consider to represent its best embodiment. However, it should be understood that, within the scope of the appended claims, the invention may be practiced otherwise than as specifically illustrated and described.

We claim:

1. Apparatus for cooling and sizing a molten plastic extrudate comprising:
    a vacuum chamber containing water;
    an entry passage into said vacuum chamber for said plastic extrudate;
    an exit passage from said vacuum chamber for said plastic extrudate;
    seal means sealing said entry passage and said exit passage while said plastic extrudate is passing through said passages;
    a variable speed motor driven vacuum pump to reduce the atmospheric pressure within said vacuum chamber;
    an adjustable vent valve to admit atmospheric pressure to said vacuum chamber in varying amounts depending upon the amount said vent valve is open;
    a pressure transducer to sense the level of pressure within said vacuum chamber; and
    an electrical circuit that controls the speed of said vacuum pump motor and the position of said adjustable vent valve to control the level of pressure within said vacuum chamber in response to signals from said pressure transducer.

2. The apparatus of claim 1 wherein said adjustable vent valve is always open to some degree to admit atmospheric pressure to said vacuum chamber.

3. The apparatus of claim 1 wherein said electrical circuit contains a microprocessor to coordinate the speed of said vacuum pump motor and the position of said adjustable vent valve.

4. The apparatus of claim 1 wherein the variable speed motor driving said vacuum pump is a pulse width modulated AC motor.

5. The apparatus of claim 1 wherein said vent valve is a needle valve operated by a one-thousand position electrical step motor.

6. The apparatus of claim 1 wherein water in said vacuum chamber is supplied from a closed sump tank that is maintained at the same vacuum level as said vacuum chamber.

7. The apparatus or claim 1 wherein said vacuum chamber has an entry sub-chamber at its inlet end.

8. The apparatus of claim 1 wherein said vacuum chamber has a water seal chamber adjacent the exit end of said vacuum chamber.

9. The apparatus of claim 1 wherein said vacuum chamber contains hold-down rollers that may be repositioned within said vacuum chamber to accommodate extrudate of various sizes.

10. The apparatus of claim 1 wherein said pressure transducer and said vent valve are located in a control cabinet with said electrical circuit.

11. Apparatus for cooling and sizing a molten plastic extrudate comprising:
    a vacuum chamber having a main chamber, an entry sub-chamber at the inlet end of said main chamber and a water seal chamber adjacent the exit end of said vacuum chamber, said vacuum chamber containing water;
    an entry passage into said entry sub-chamber for said plastic extrudate;
    an exit passage from said main chamber into said water seal chamber for said plastic extrudate;
    seal means sealing said entry passage and said exit passage while said plastic extrudate is passing through said passages;
    a variable speed motor driven vacuum pump to reduce the atmospheric pressure within said vacuum chamber, said variable speed motor being a pulse width modulated AC motor;
    an adjustable vent valve comprising a needle valve operated by an electrical step motor to admit atmospheric pressure to said vacuum chamber in varying amounts depending upon the amount that said vent valve is open;

a pressure transducer to sense the level of pressure within said vacuum chamber; and an electrical circuit including a microprocessor that controls the speed of said vacuum pump motor and the position of said adjustable vent valve to control the level of pressure within said vacuum chamber in response to signals from said pressure transducer, said microprocessor coordinating the speed of said vacuum pump motor and the position of said adjustable vent valve.

12. The apparatus of claim 11 wherein a skinning tool is affixed to said entry sub-chamber to skim said plastic extrudate before it enters said entry passage into said entry sub-chamber.

13. The apparatus of claim 11 wherein an air drying chamber is positioned adjacent to said water seal chamber whereby said plastic extrudate is subjected to drying air after leaving said water seal chamber.

14. The apparatus of claim 11 wherein said adjustable vent valve is always open an amount equal to ten percent of its maximum through-put to admit atmospheric pressure to said vacuum chamber.

15. The apparatus of claim 11 wherein water in said vacuum chamber is supplied from a closed sump tank that is maintained at the same vacuum level as said vacuum chamber.

16. Apparatus for cooling and sizing a molten plastic extrudate comprising:

a vacuum chamber having a main chamber, an entry sub-chamber at the inlet end of said main chamber and a water seal chamber adjacent the exit end of said vacuum chamber;

a water system to provide water into said vacuum chamber, said water system including a water pump, a closed sump tank, a make-up tank to provide make-up water to said closed sump tank, water lines containing control valves to convey water from said closed sump tank to said main vacuum chamber, to said entry sub-chamber and to said water seal chamber, and drain lines to return water to said closed sump tank and said make-up tank;

an entry passage into said entry sub-chamber for said plastic extrudate;

an exit passage from said main chamber into said water seal chamber for said plastic extrudate;

seal means sealing said entry passage and said exit passage while said plastic extrudate is passing through said passages;

an air drying chamber following said water seal chamber in the direction of movement of said plastic extrudate whereby said plastic extrudate is subjected to drying air after leaving said water seal chamber;

a variable speed motor driven vacuum pump to reduce atmospheric pressure within said vacuum chamber, said variable speed motor being a pulse width modulated AC motor;

an adjustable vent valve comprising a needle valve operated by an electrical step motor to admit atmospheric pressure to said vacuum chamber in varying amounts depending upon the amount that said vent valve is open;

a pressure transducer to sense the level of pressure within said vacuum chamber;

a vacuum system including said variable speed motor driven vacuum pump, said adjustable vent valve, and said pressure transducer; and an electrical circuit including a micro-processor that controls the speed of said vacuum pump motor and the position of said adjustable vent valve to control the level of pressure within said vacuum chamber in response to signals from said pressure transducer, said micro-processor coordinating the speed of said vacuum pump motor and the position of said adjustable vent valve.

17. The apparatus of claim 16 wherein said adjustable vent valve is always open an amount equal to at least ten percent of its maximum opening to admit atmospheric pressure to said vacuum chamber.

18. The apparatus of claim 16 wherein said closed sump tank and said vacuum chamber are maintained at the same vacuum level.

19. The apparatus of claim 16 wherein said vacuum chamber contains hold-down rollers than may be repositioned within said vacuum chamber to accommodate extrudate of various sizes.

20. The apparatus of claim 16 wherein a skinning tool is affixed to said entry sub-chamber to skim said plastic extrudate before it enters said entry passage into said entry sub-chamber.

* * * * *